US008918368B2

(12) United States Patent
Du et al.

(10) Patent No.: US 8,918,368 B2
(45) Date of Patent: Dec. 23, 2014

(54) SYSTEM AND METHOD FOR PROVIDING ACCESS TO A FILE IN REAL TIME DURING A CLOUD STORAGE UPLOAD PROCESS

(71) Applicant: Gladinet, Inc., Fort Lauderdale, FL (US)

(72) Inventors: Haikun Du, Boca Raton, FL (US); Zhihui Huang, Boca Raton, FL (US)

(73) Assignee: Gladinet, Inc., Fort Lauderdale, FL (US)

( * ) Notice: Subject to any disclaimer, the term of this patent is extended or adjusted under 35 U.S.C. 154(b) by 102 days.

(21) Appl. No.: 13/626,339

(22) Filed: Sep. 25, 2012

(65) Prior Publication Data
US 2013/0091188 A1   Apr. 11, 2013

Related U.S. Application Data

(60) Provisional application No. 61/539,328, filed on Sep. 26, 2011.

(51) Int. Cl.
*G06F 17/30* (2006.01)
*H04L 29/08* (2006.01)

(52) U.S. Cl.
CPC ...... *G06F 17/30194* (2013.01); *H04L 67/1097* (2013.01)
USPC ........... 707/687; 707/788; 707/693; 707/736; 707/758; 707/781

(58) Field of Classification Search
USPC .......... 707/609, 687, 688, 693, 736, 758, 781
See application file for complete search history.

(56) References Cited

U.S. PATENT DOCUMENTS

2011/0022642 A1*  1/2011  deMilo et al. ................. 707/805
2011/0225128 A1*  9/2011  Jarrett et al. .................. 707/692

* cited by examiner

*Primary Examiner* — Sana Al Hashemi
(74) *Attorney, Agent, or Firm* — Edwards Wildman Palmer LLP; Howard M. Gitten

(57) ABSTRACT

A cloud server includes a cloud storage for storing a folder uploaded to the cloud server, a database for storing administrative data; and a cloud service application. The cloud service application establishes a communication connection with an end point device to retrieve a user identification about the user, the end point device name, and folder name and location and stores this information in the database. A remote device communicates with the cloud server to access a folder stored on at least one of the endpoint device and the cloud storage. The cloud service application determines an authorized user and provides access to the folder by providing direct access to the endpoint device from the remote device utilizing the communication connection during uploading of the folder to the cloud, or directly to the cloud storage if the folder has been uploaded.

11 Claims, 15 Drawing Sheets

SYSTEM AND METHOD FOR PROVIDING ACCESS TO A FILE IN REAL TIME DURING A CLOUD STORAGE UPLOAD PROCESS

CROSS REFERENCE TO RELATED APPLICATION

This application claims priority to Provisional Patent Application No. 61/539,328, filed Sep. 26, 2011, and is incorporated herein as set forth in its entirety.

BACKGROUND OF THE INVENTION

This invention is directed to a system and method for uploading stored folders to the cloud, and in particular, providing access to a folder being uploaded during the upload process.

As a result of the adoption of cloud computing, it is well known in the art to store applications, files and data (collectively and individually folders) remotely; particularly large data. However, this requires a process of selecting folders containing either data or software applications for uploading. Because the folders being uploaded to the cloud servers are generally large files, it often requires a secure connection for a long period of time so that entire folder may be securely and accurately uploaded in as large a file as possible preventing use of the folders by other computing devices. However, as a result of the folder size, the process takes a long time, sometimes hours if not days. Many operations can not function without access to these folders over such a long period of time. Therefore, a system and methodology which overcomes the shortcomings of the prior art is desired.

BRIEF SUMMARY OF THE INVENTION

A system which provides access to a folder as it is uploaded to a cloud storage server includes a user device upon which a folder resides, a cloud server and a remote device seeking access to the folder being uploaded to the cloud server. The user device and the remote device communicate with the cloud server. The user device communicates with the cloud server establishing a communication link, to upload a folder from the user device to the cloud server, the cloud server mapping the folder to the user device name; a user account and folder description. The remote device transmits a request to the cloud server for access to a folder and the cloud server provides access to the folder at the user end point device when the folder has not been completely uploaded, or to the folder as stored at the cloud server when the folder has been at least partially uploaded.

BRIEF DESCRIPTION OF THE DRAWINGS

The present disclosure will be better understood by reading the written description with reference to the accompanying drawing figures in which like reference numerals denote similar structure and refer to like elements throughout, in which.

DETAILED DESCRIPTION OF THE PREFERRED EMBODIMENTS

Figure 1:
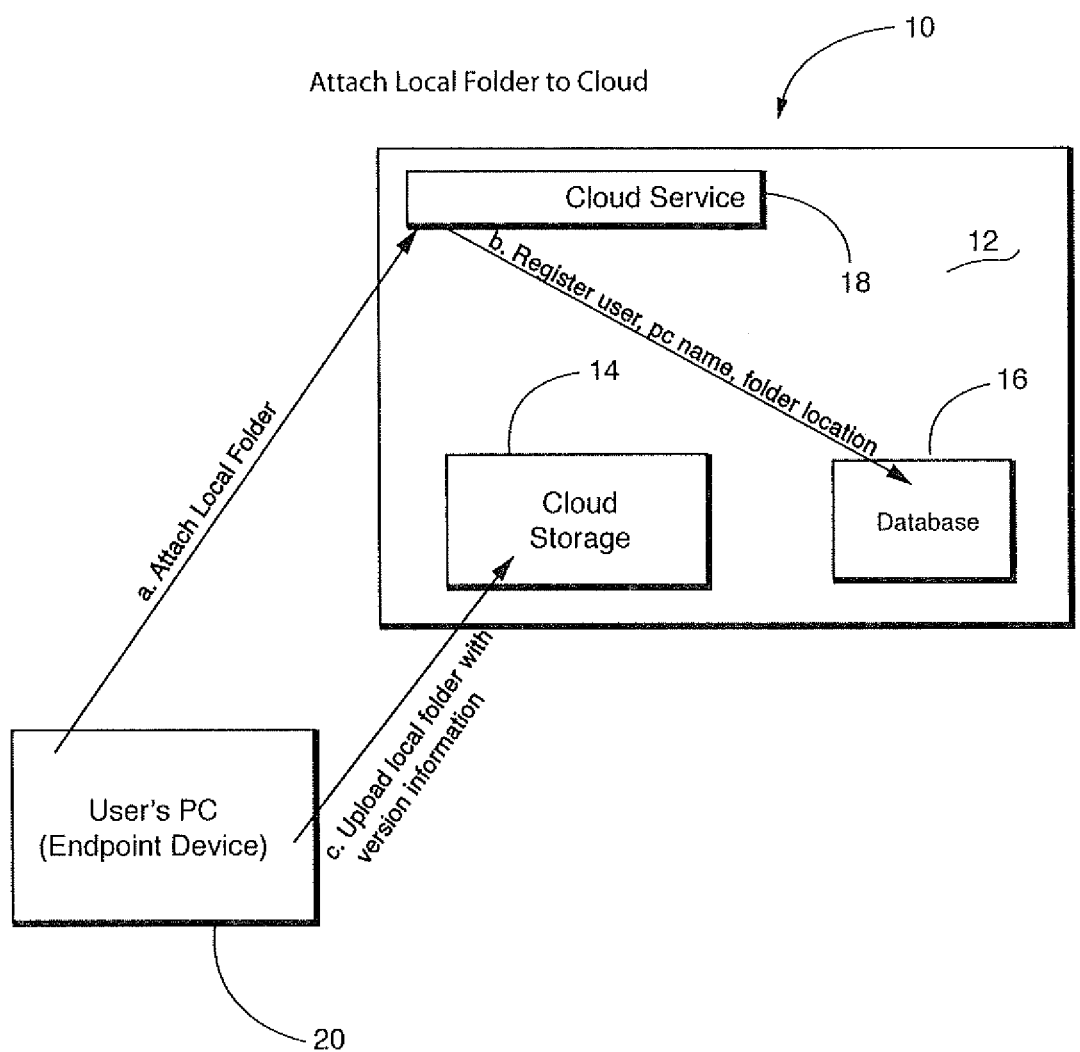
FIG. 1 is an operational diagram for a system for uploading a file to a cloud server in accordance with the invention.

As shown in FIG. 1, a system 10 includes a cloud server 12. For the purposes of this description, a cloud server is a virtual server made up of two or more computer devices acting in unison which provide at least a portion of their computing power and/or data storage capacity when accessed by a remote computer to use applications, data or other files stored thereon.

Cloud server 12 includes a cloud storage 14 for storing folders uploaded to cloud server 12. Cloud server 12 also includes an administrative database 16 for storing administrative information such as registered user identification (names, passwords or the like), end point device computer names (DNS names and assigned cloud related IDs), folder names, contents and locations and the like as will be described in greater detail below. A cloud service application 18 runs on cloud server 12 for operating cloud server 12 and managing the operation between cloud storage 14 and database 16 and exterior devices. In this way, cloud server 12 operates under the software commands as performed by cloud service application 18.

System 10 also includes an end point device 20 such as a personal computer (PC), in one non-limiting exemplary embodiment, communicating with server 12 utilizing known protocols. End point device 20 may be any computing device capable of storing and operating on files within folders and folders themselves, and communicating with a server.

In a preferred, but non-limiting embodiment, cloud service application 18 is an exposed set of an Application Programming Interface (API) relating to user account management and storage management. It may be Microsoft® Windows® Communication Foundation (WCF) service running on a Windows® server or a MAC OS running on a MAC device. In this way, as will be discussed in greater detail below, cloud service API 18 is capable of causing the uploading and downloading of folders between devices 20, 30 and cloud server 12, as well as creating folder listings and other administrative data for tracking folders and their use.

End point device 20 communicates with cloud service application 18 to present a folder name space to the end user. It also maintains active communication connections with cloud service API 18 to service any local folder related access.

As known in the art, during operation, a user at end point device 20 will establish an account for use of cloud server 12 and will select a storage amount to which the user will have access in cloud storage 14, and number of authorized users. An administrator will be determined with the ability to create sub-users, manage the storage plan and create shared team folders as will be discussed below.

Figure 3:
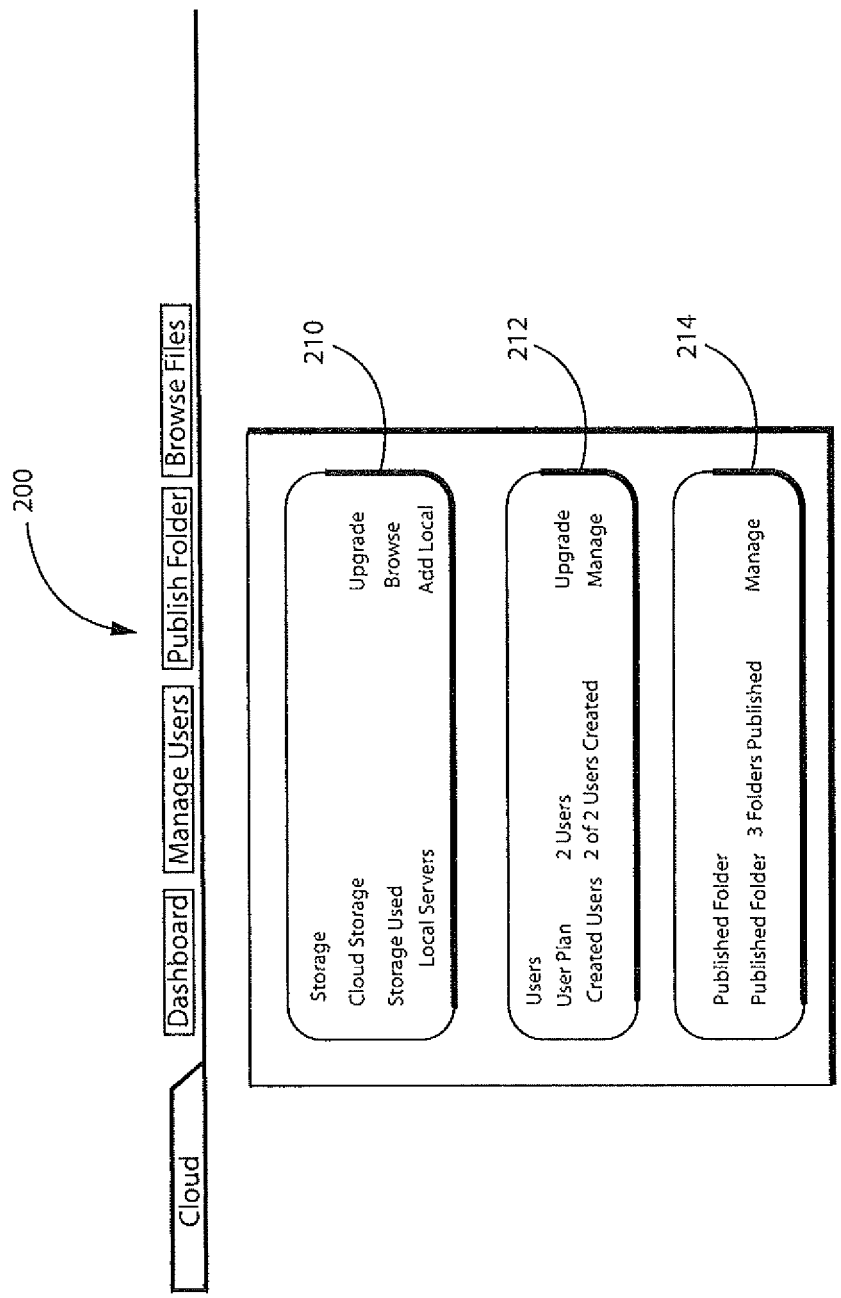
FIG. 3 is a screen shot for managing data storage, user access and published team folders in accordance with the invention.

For each use, the administrator or the authorized users log in to an account. The administrator, is presented with a screen shot 200 (FIG. 3) showing the current status of the available storage 210, the number of authorized users 212, and the number of published folders 214. The administrator can use this page to create sub-users, change a storage plan (increase or decrease available space at cloud storage 14), create a shared team folder or the like, merely by selecting the appropriate icon utilizing a graphic user interface (GUI) and/or web browser as known in the art.

During operation, the user of system 10 has already provided to cloud server 12 the DNS name and/or assigned ID of its end point device 20, its account identification or registered user identification, for use by the cloud service API 18. This information is stored in administrative database 16.

Figure 4:
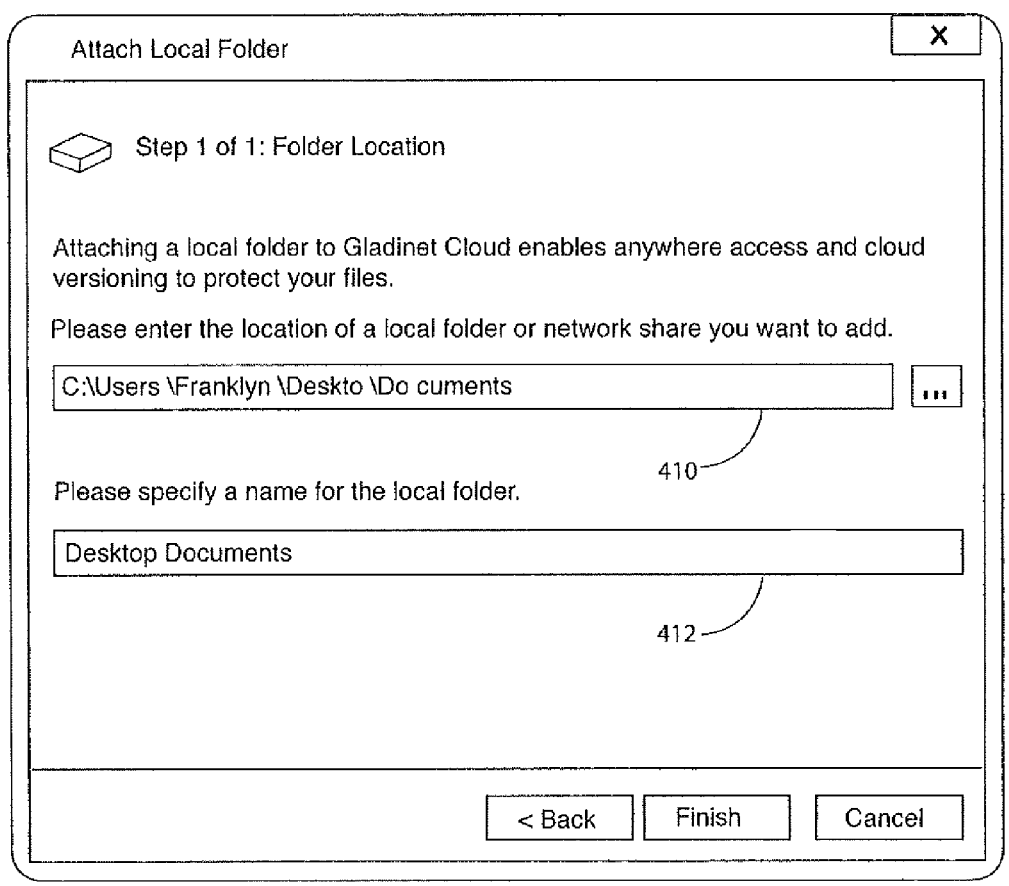
FIG. 4 is a screen shot for selecting a local folder to be attached to the cloud in accordance with the invention.

In order to attach a local (end point device 20 based) folder for uploading to cloud server 12, in a step a (FIG. 1), the user may utilize a GUI dialog box 400 (FIG. 4) as shown in FIG. 4 to select a local folder stored on end point device 20 at an input 410 by inputting a folder name at an input 412 and local folder location at an input 410 to be attached with the folder and to enable cloud service API 18 to process the identified local folder.

In a step b (FIG. 1), the cloud service API 18 uses this information to map the identification for the user at end point device 20, the PC DNS name and/or assigned ID, and the folder location within end point device 20, and stores the mapped information in cloud administrative database 16. At the same time, cloud server API 18 causes the identified local folder stored on end point device 20 to be uploaded, preferably with version information to cloud storage 14 in accordance with step c (FIG. 1). Because the request to upload originates with endpoint device 20, both devices (20, 12) are trusted and a second communication connection is used to upload folders.

A folder may contain thousands of files. As each file within a folder is uploaded to cloud storage 18, it causes a status update such as a time stamp or version number to be stored in a change log, created and stored in cloud storage 14.

Figure 5:
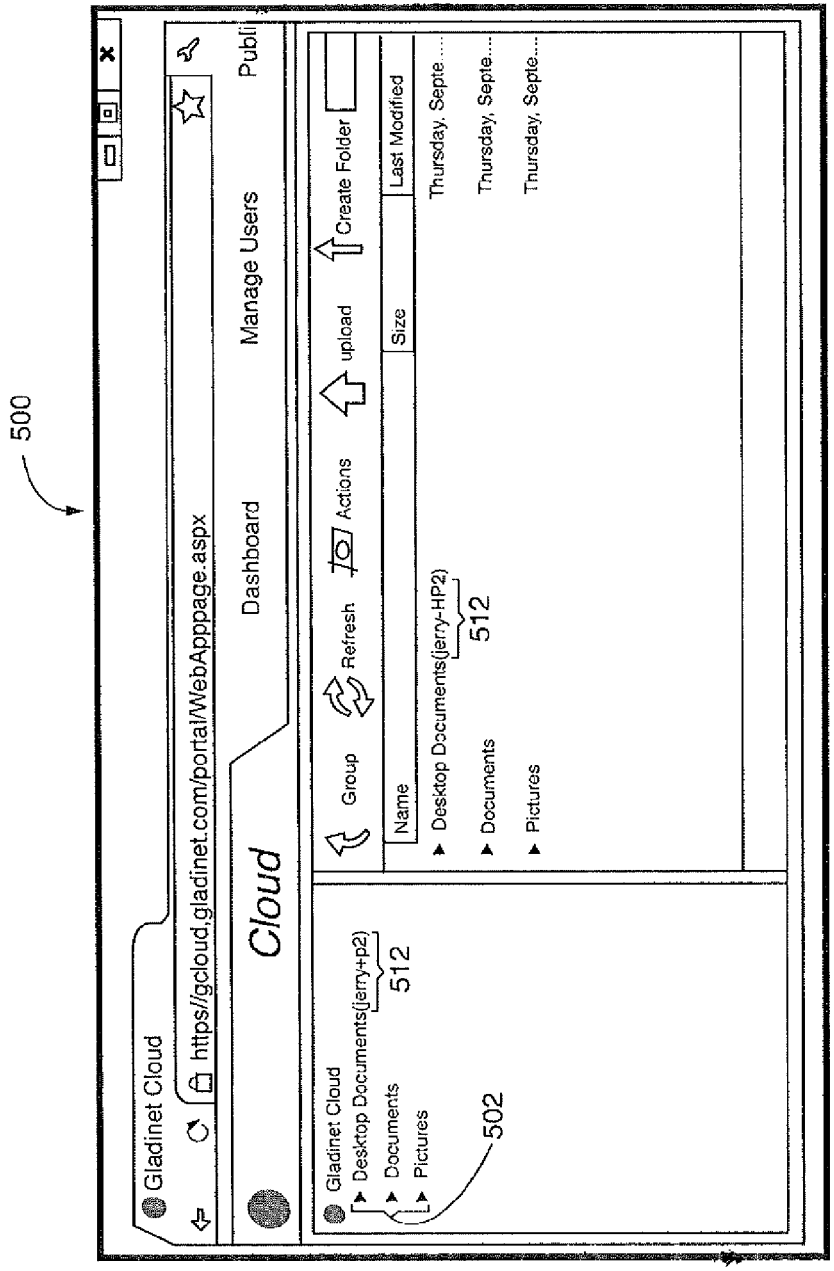
FIG. 5 is a screen shot for viewing a unified storage name space, including cloud storage and attached local storage in accordance with the invention.
Figure 6:
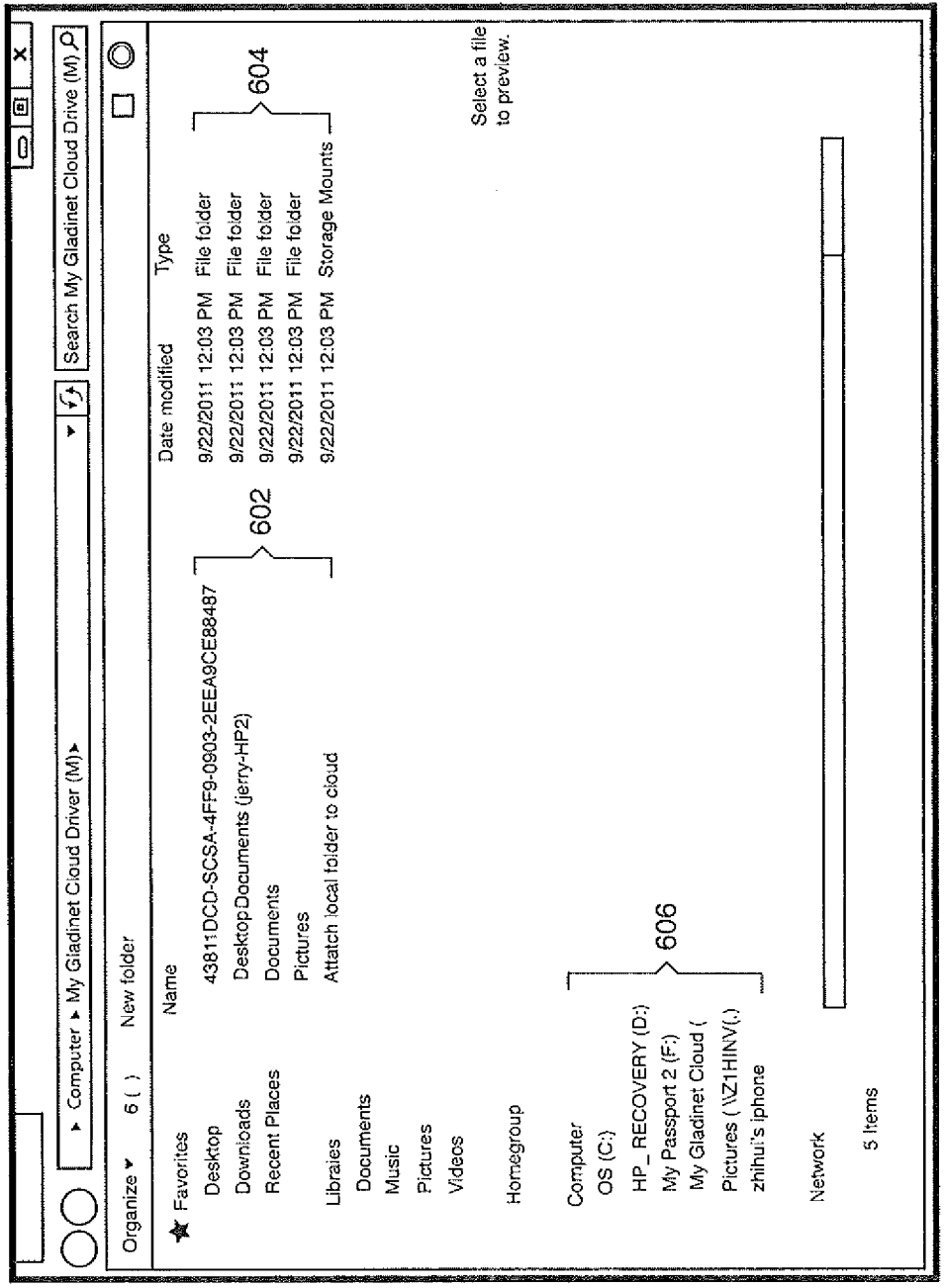
FIG. 6 is a screen shot, as shown to a system user, of the unified cloud storage and local storage name space in a mapped network drive in accordance with the invention.

When a user utilizes end point device 20 to communicate with cloud server 12, they may access a web page 500 utilizing a web browser (FIG. 5) showing a schedule of those folders 502 uploaded to cloud server 12 to access the desired local folder. The local folder appears with the given names 512, such as "desktop documents" or "pictures" and may be followed by the endpoint device 20 names such as "Jerry-HP2". Because this folder location identifier may not be sufficiently unique, it is stored in administrative database 16 mapped to the endpoint device ID and DNS name so that the user as well as system 10 tracks which end point device 20 provides the attached local folder. In a windows mapped network drive view screen shot 600 (FIG. 6), a GUI interface provides information regarding each folder 602 as stored in cloud server 12; including the folder type description 604 and a determination of which source device (computer) is associated with which folder. Cloud service API 18 maps the folder type to the folder name and location, creates a folder name space for a directory, and makes it accessible at page 600. In this way a file may be later selected for use by utilizing GUI interface 600 as known in the art.

Figure 7:
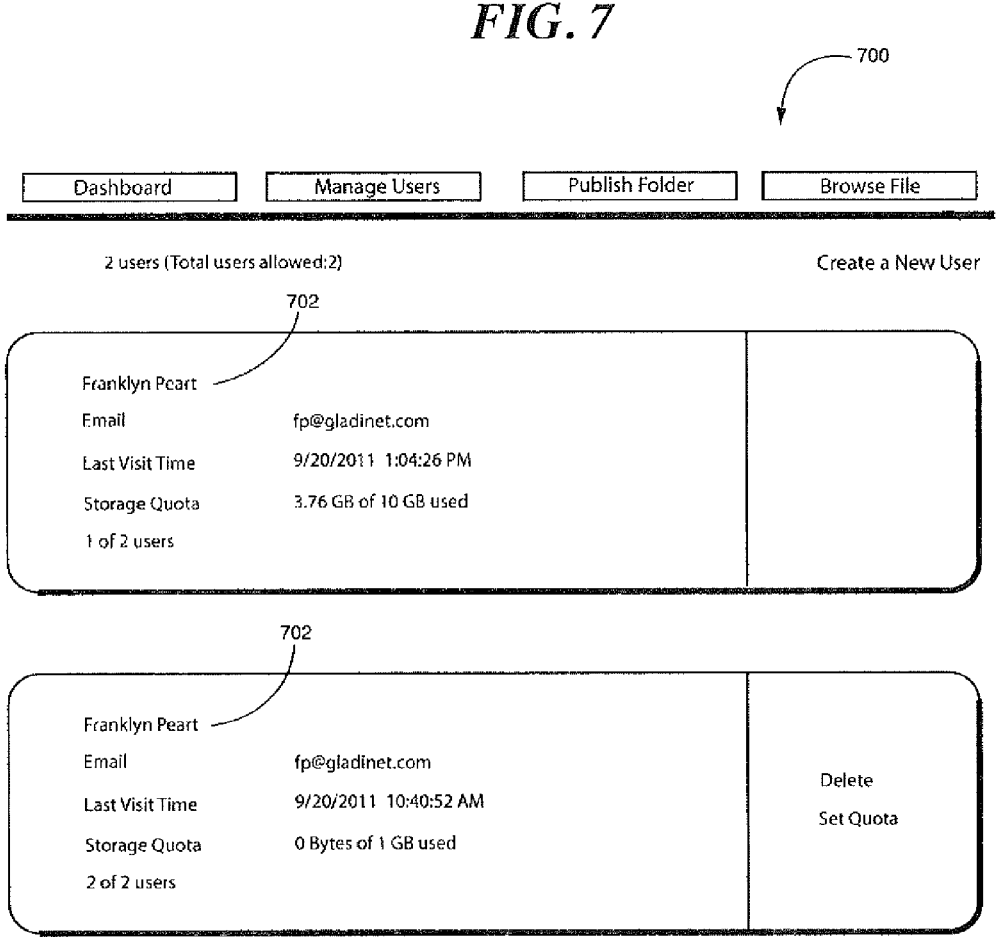
FIG. 7 is a screen shot of an administrator's management page shown in the user interface in accordance with the invention.
Figure 8:
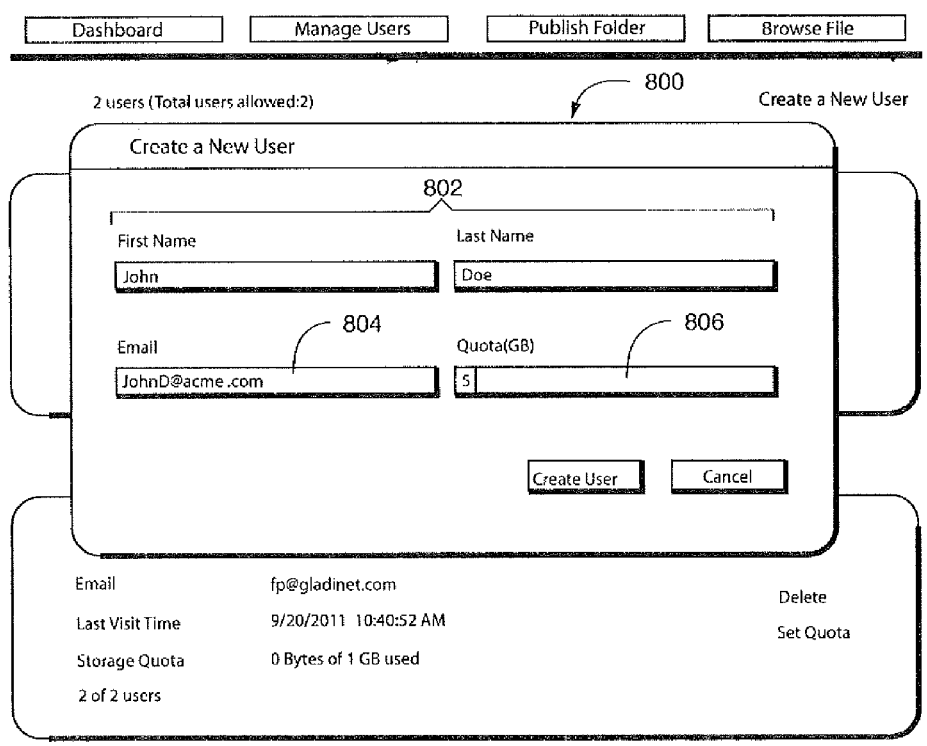
FIG. 8 is a screen shot of an interface for enabling an administrator to create a new user utilizing a web browser in accordance with the invention.

As shown in a FIG. 7, a screen shot 700 is provided as would be accessible through a web browser to the administrator. Screen shot 700 shows current sub-account users 702. In this way, an administrator is also always aware of the number of sub-account users having access to individual files. After initial creation of the account, an administrator may create new users utilizing the create new user icon interface 704. As seen in FIG. 8, a new user is created by providing minimal information in a window 800 by providing information such as a user's first and last name 802, an email address 804 and determining an amount of storage 806 to be made available to a user. Dialog box 800 operates as known in the art and once input, cloud server API 18 stores this information in administrative database 16.

Figure 9:
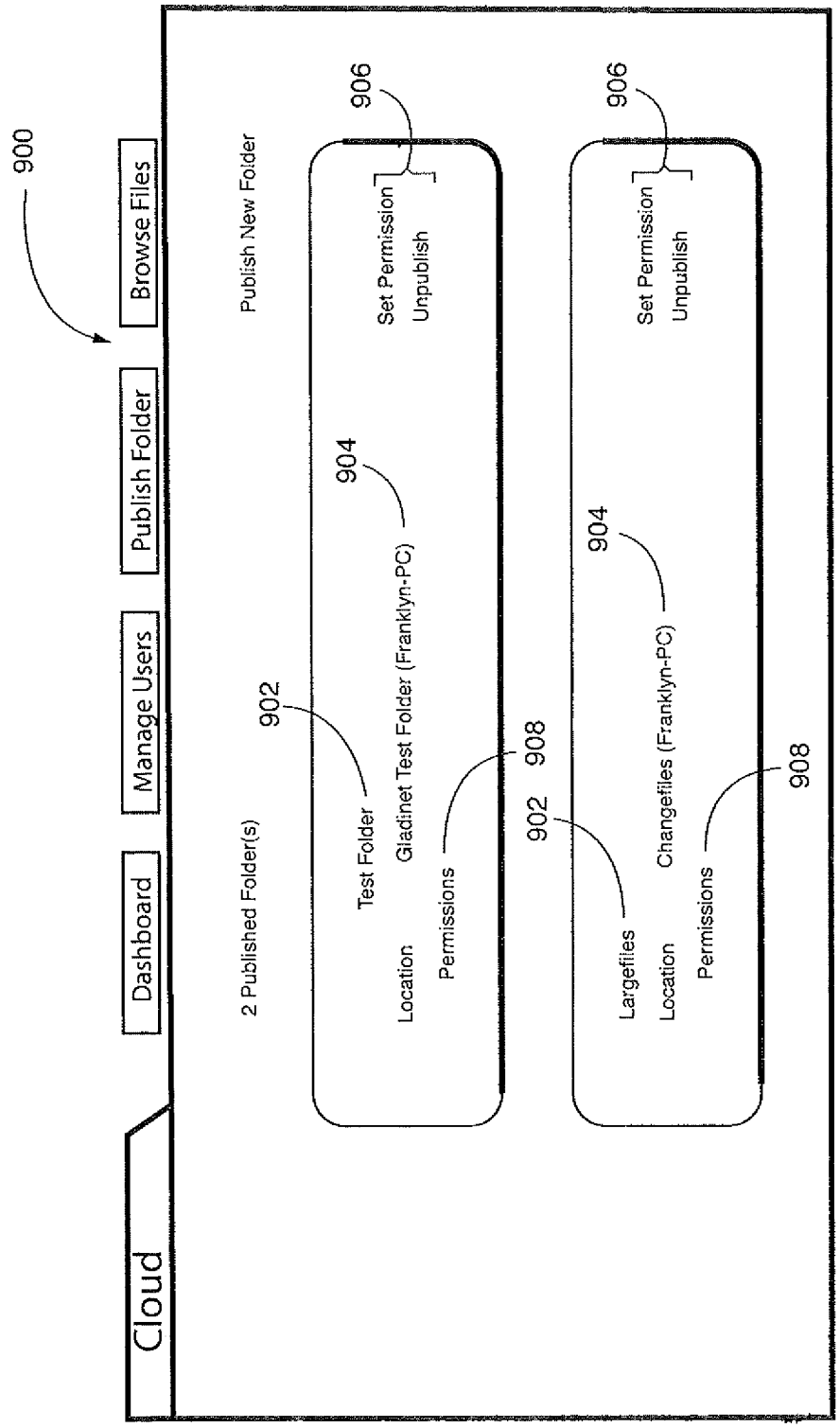
FIG. 9 is a screen shot of a page of an interface for allowing the administrator to publish team folders utilizing the web browser in accordance with the invention.

In some instances, an administrator may desire to create a shared team folder. Such activity is enabled by cloud server 12; the ability to provide access to multiple users to a single folder. This folder may either be stored at cloud storage 14, or, be an attached local folder being uploaded to cloud storage 14, but currently stored in its entirety at end point device 20. The administrator is provided with a screen shot 900 (FIG. 9), which through GUI interface, identifies the name of the folder 902, the location of the folder such as a specific end point 20 PC or in the cloud storage 14, and provides the ability for the administrator to set permissions or to enable the folder to published or unpublished, utilizing a GUI interface 906 as known in the art. Once set, the permission is listed in a link 908 to a drop down window as known in the art.

Figure 10:
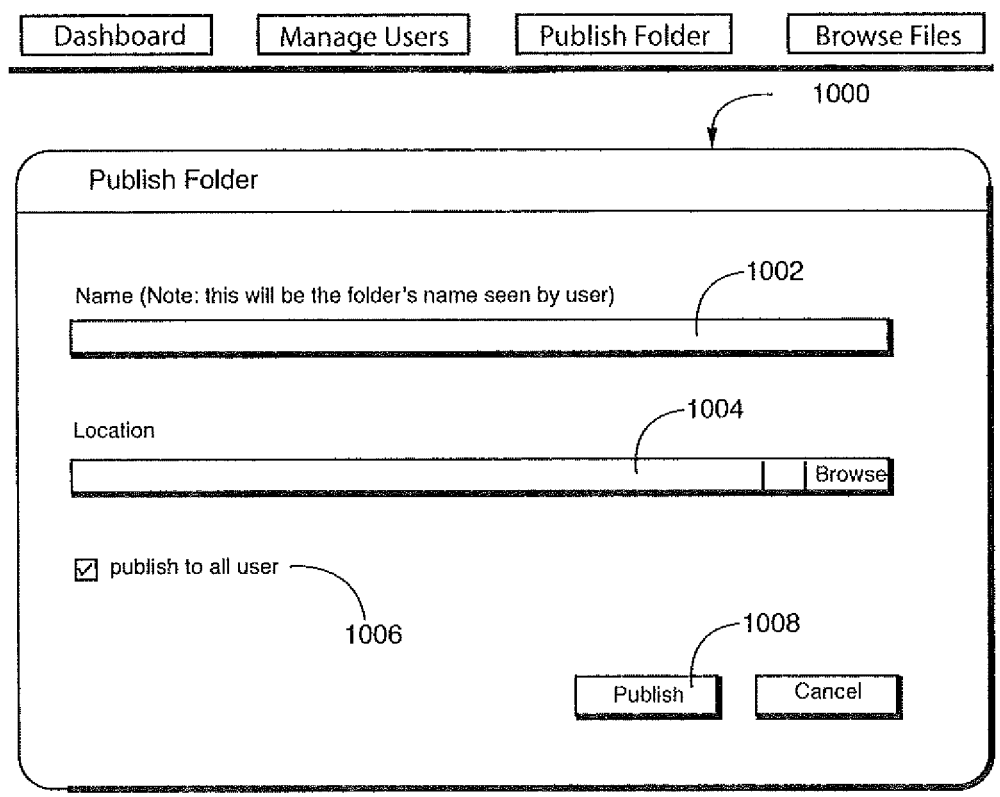
FIG. 10 is a screen shot of a web page within a browser for an administrator to name a folder for publication in accordance with the invention.
Figure 11:
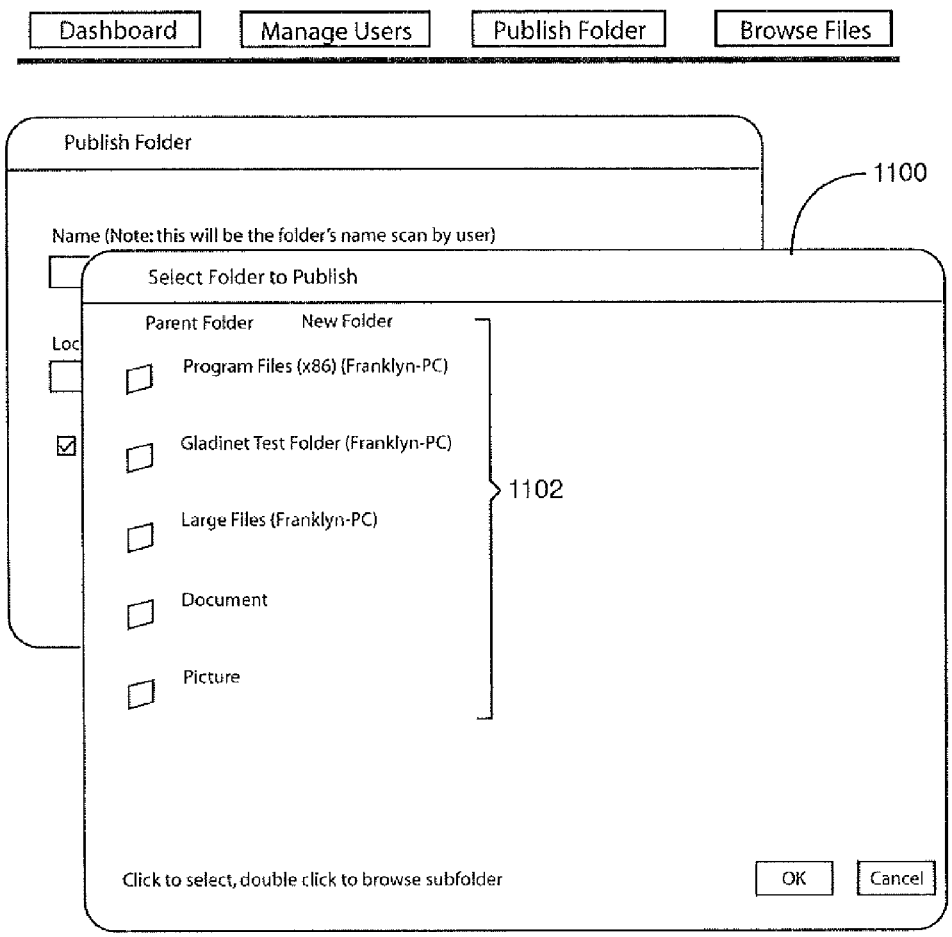
FIG. 11 is a screen shot of an interface for enabling an administrator to select either attached local folders or folders stored at the cloud server to publish in accordance with the invention.
Figure 12:
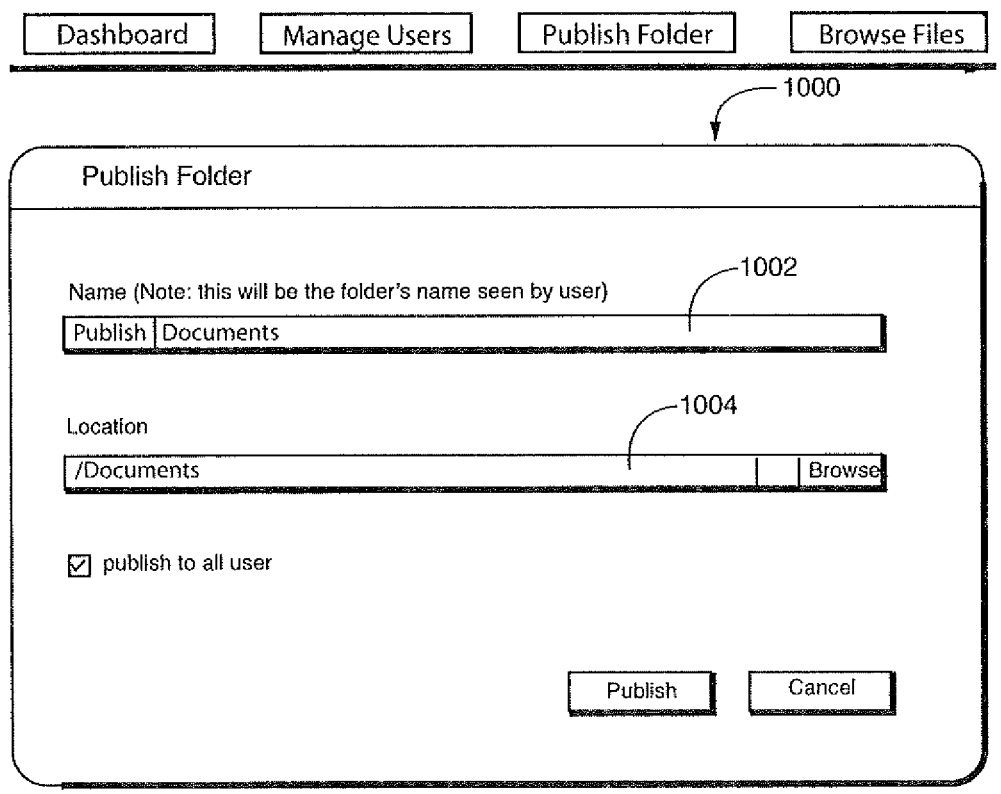
FIG. 12 is a screen shot of a web page within a browser for enabling the administrator to name a published folder in accordance with the invention.
Figure 13:
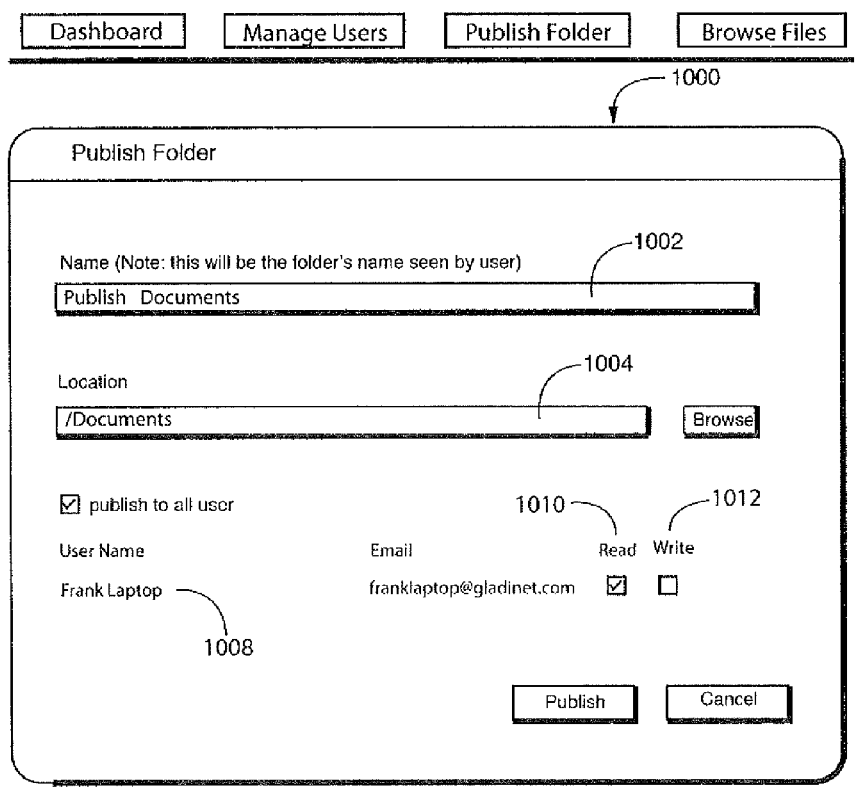
FIG. 13 is screen shot for allowing the administrator to give user permissions to the published team folder in accordance with the invention.

If it is desired to publish a folder, then folders may be published in a variety of ways. In a window 1000 (FIG. 10), a known folder may be selected for publication by identifying the name of the folder in a field 1002 and the location of the folder in a field 1004. The folder may be published to all users or a single identified user by selecting an icon 1006 and completing the published command by selecting the published icon 1008. Alternatively, a drop down menu 1100 which may be triggered by a browse command in window 1000 identifies the folders 1102 to be selected for publication to populate a published folder window 1000 (FIG. 12) by identifying the documents by name 1002 and location 1004. In this non-limiting example, the public documents 1002 are to be published to all users. Alternatively, if documents are to be published, then in published folder window 1000 (FIG. 13), specific users 1008 may be authorized to read 1010 or write 1012 from or into the selected folder 1002.

As discussed above, cloud service API 18 works with database 16 to create a mapped database or directory of folder names, folder elements (files), folder origin (end point device 20), and the user identification for authorized users associated with each folder. Cloud service API 18 is building this directory as folders are uploaded to cloud storage 14 from end user device 20 in real time. Therefore, although a folder may include a thousand files by way of non-limiting example, if early in the process, and only two files of a folder have been uploaded to cloud storage 14, then only information about those two files is what is created and stored in cloud storage 14. The directory includes folder information such as file names, file version date stamp, and file size as each file is uploaded Reference is now made to FIG. 2 wherein the system 10 enables access to the folder from a remote device. Like numerals are utilized to indicate like structure. The primary difference is utilizing a remote device capable of communicating with cloud service API 18.

Remote device 30 is any computing device, such as a PC, mobile device, smartphone, laptop, tablet, or the like, capable of communicating with cloud server 12 to operate on folders. The user of remote device 30 may be any authorized user, but is usually the same user as the user of end point device 20 desiring access to folders from another location.

Figure 2:
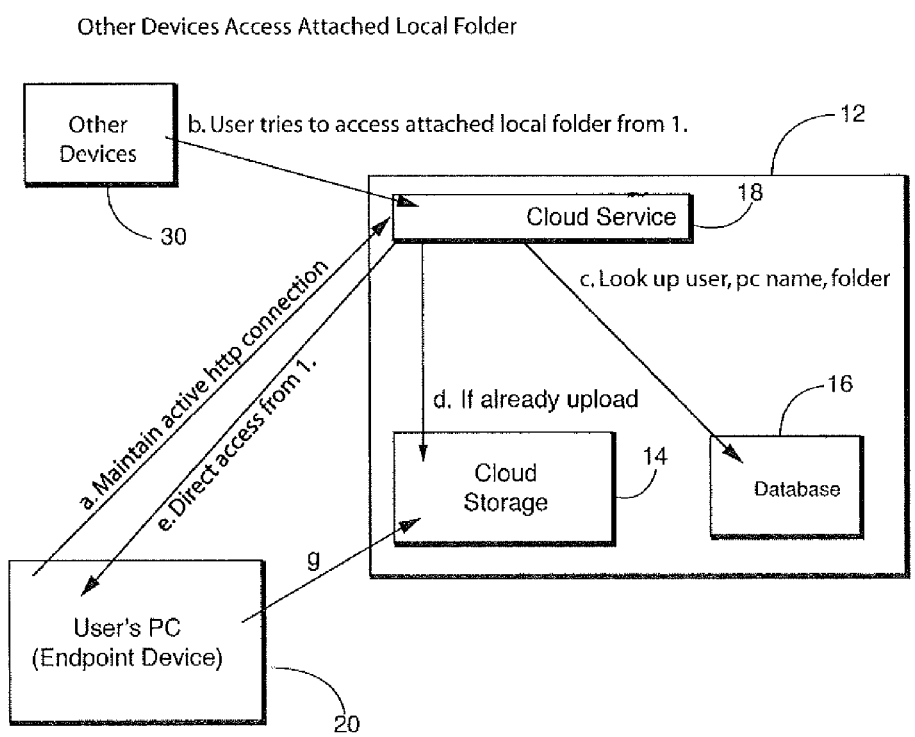
FIG. 2 is an operational diagram for the system for accessing a file utilizing the cloud server either during the upload process or after completion of the upload process in accordance with the invention.

During operation, end point device 20 communicates with cloud service API 18 by maintaining an active two-way communication connection, such as a HTTP connection in a web environment, by way of non-limiting example, in a step a (FIG. 2). This is required to maintain communication so that cloud service API 18 may manage the uploading process. Upload to cloud storage 14 still occurs along a separate communication connection in step g.

In a step b, the user utilizes remote device 30, to communicate with cloud server 12 by utilizing the exposed cloud service API 18 to access a target folder.

The user at remote device 30 provides the folder name and as a result of a login, a user identification as a folder request. Cloud server API 18 uses the user's prestored name or other user identification stored in database 16 to determine access rights to the folders and corresponding files associated with the authorized user. In this way, cloud server API 18 confirms that the user and remote device 30 are trusted and access may be provided to endpoint 20. In response to the authorized request from the user at remote device 30, cloud service API 18 responds to an authorized user by creating a folder name space showing all folders and directory of files therein for those folders accessible to the user as determined from the information stored in administrative database 16.

Cloud service API 18 determines whether or not there is in fact an ongoing communication connection with end point device 20 which signifies that uploading of a folder may not be complete. If a determination is made that uploading is still going on, cloud service API 18 utilizes location information for particular folders and files as stored at cloud storage 14 to first populate a folder name space with the files stored at cloud storage 14 and also retrieve a directory from endpoint device 20 of the target folders and associated files. Cloud service API 18 merges the cloud storage directory with the endpoint device directory to create a folder name space showing all files within a folder and their most recent location. This is presented to the user at remote device 30 in a manner such as that shown in screen shot 600. A user would select the target folder utilizing GUI to obtain a dropdown list of files within that folder. By selecting the folder, cloud service API 18 determines whether the folder has been uploaded to cloud storage 14 or not. It is noted that the folder name space may be a mapped virtual drive, a web client, or any other method for providing a list of folders and their contents to a user at remote device 30.

If it is determined that upload has been completed, then cloud service API 18 provides access to the folder as stored in cloud storage 14 in a step d. However, if the cloud server API 18 determines that the desired folder has not been completely uploaded, then cloud service API 18 causes cloud server 12 to provide direct access to endpoint device 20 in a step e utilizing the secure communication connection established in step a. In this way, cloud server 12 provides a bridge between remote device 30 and end point device 20 prior to completion of uploading.

This is enabled by the fact there is a preexisting active communication connection such as an HTTP handshake communication between end point device 20 and cloud server 12, by way of non-limiting example, in order to allow access to the exposed cloud service API 18 as well as data storage 14. There is a trusted protocol providing access through the firewalls between stored server 12 and end point device 20. Cloud server API 18 utilizes this preexisting communication link to allow remote device 30 to access the local folder at end point device 20.

In summary, when an end user initiates a folder access request from remote device 30 to cloud service API 18 to access a specified local folder attached from endpoint device 20, the cloud service API 18 will locate the connection from the endpoint device 20 utilizing the end device point 20 DNS name and/or device ID, folder location, and user information as stored in database 16. If the local only mode is set, then the cloud service API will access the request directly by requesting files and folders from the endpoint device 20 utilizing the located ongoing communication connection. If the folder uploading is not currently being performed, then it is assumed that the upload is complete and the cloud service API 18 will service the access request directly by requesting files and folders from a location in cloud storage 14 as stored in administrative database 16. However, if there is an ongoing upload, if the endpoint device 20 has already finished uploading the content of the target folder, then cloud service API 18 will service the access call from remote access device 30 directly by requesting the files and folders from cloud storage 14. If cloud service API 18 has determined that uploading is not complete, then cloud service API 18 will respond to the request by combining results from both cloud storage 14 and the folder as stored on endpoint device 20.

Figure 14:
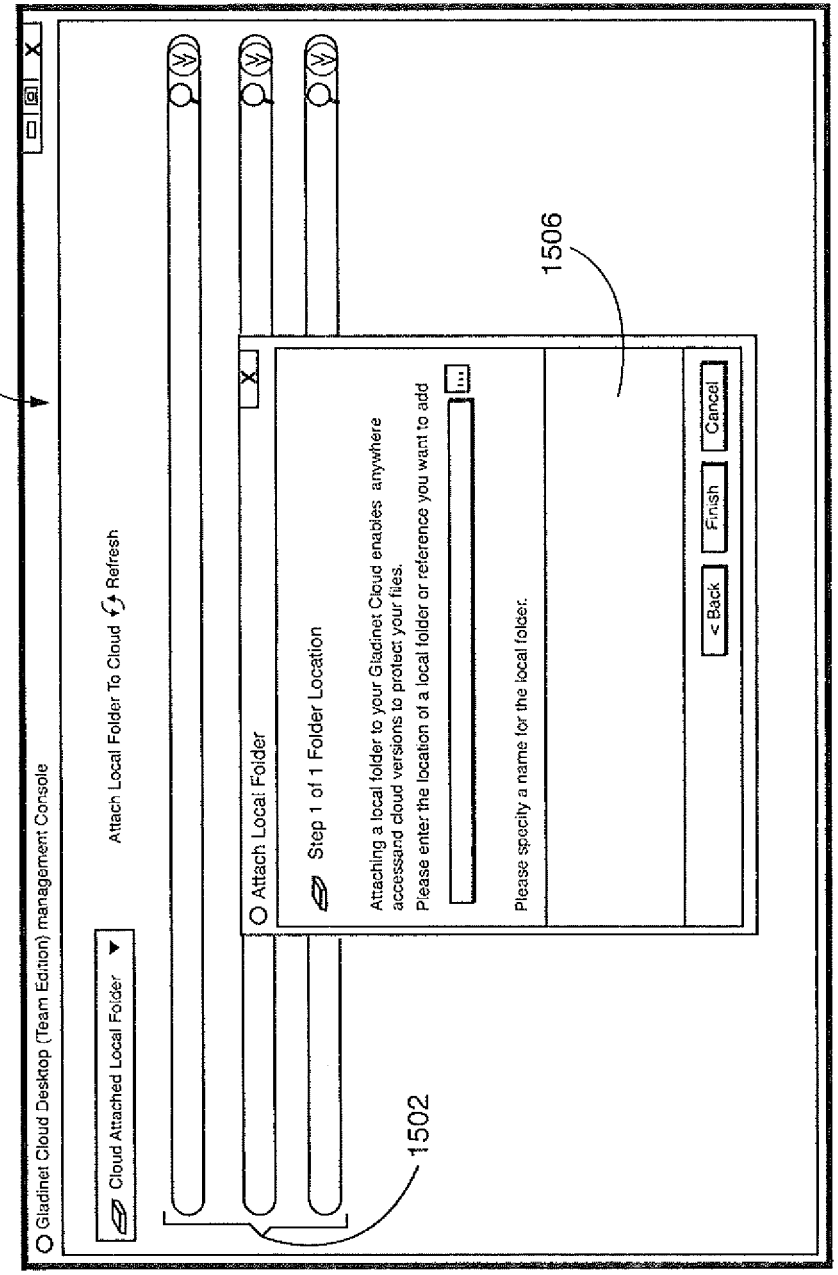
FIG. 14 is a screen shot for attaching a local folder from a remote device in accordance with the invention.
Figure 15:
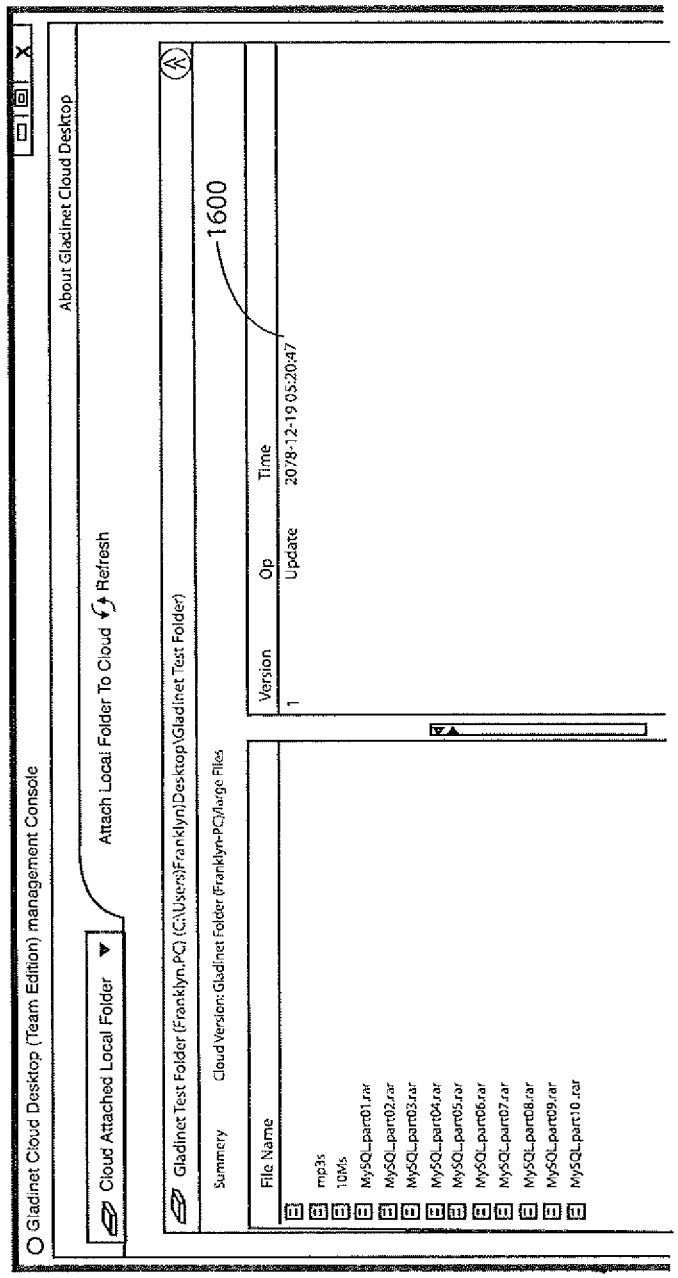
FIG. 15 is a screen shot of a user interface of version control information for files viewed from the remote device in accordance with the invention.

In operation, the user of remote device 30 will be provided with screen 600 or screen 1500 (FIG. 14) utilizing a browser showing local folders 1502 which are accessible from remote access device 30. By selecting the local folders attached to the cloud, or by enabling a folder location box 1506 and entering the location of the folder and the name of the folder, cloud service API 18 may make the above determinations for allowing access to the folder. Once selected, the user is provided with version control information related to each of the files, such as the version number, the operation and the time of the operation, a screen 1600 (FIG. 15).

The change log which forms part of the directory stored in storage cloud 14 creates version information, such as a date stamp for each file as it is uploaded to cloud storage 14. In this way, cloud service API 18 determines the version of any folder or file contained therein which is stored in the cloud. However, in the real world, files are consistently amended either within cloud storage 14 or at the endpoint device 20. Accordingly, when an authorized request from remote device 30, as described above, is received by cloud server 12, cloud service API 18 may open an active communication with endpoint device 20. Cloud service API 18 then compares the date stamp associated with the target folder or file as determined from the stored directory information in cloud storage 14 and compares that date stamp to a version identifier, as known in the art, associated with the corresponding file at endpoint device 20. Cloud service API 18 determines which file is the latest version and transmit that latest version to remote device 30 either by uploading the folder and/or file directly from cloud storage 14 or utilizing the active current communication connection to upload the file from endpoint device 20. In this manner, user remote device 30 is always provided with the most recent version of a file.

It should be noted that cloud server 12 for simplicity of description, acts as both the account administrator and the cloud server. However, it should be understood it is well within the art, to store account information separate from cloud server 12 while making it accessible to cloud server API 18, PC end user device 20, and remote access device 30.

It should be understood that utilizing user identification data, cloud names and device DNS or other identifiers, as stored in database 16 and processed by cloud service API 18, system 10 may also upload files from authorized users from remote device 30 to be accessed by endpoint device 20. Furthermore, a communication connection need not be permanently maintained, only while uploading or downloading files or entire folders from or to cloud storage 14. By maintaining open communication between the device upon which the local folder is originally stored and the cloud server during the upload process, as soon a user attaches a local folder to the cloud service, it is immediately accessible from anywhere utilizing other devices capable of communicating with an API. Regardless of the time it takes for the end point device to upload files and version information to a cloud storage area of a cloud server, all of the content of the local folder is immediately accessible to a user. In this way, there is no waiting while an application is made cloud ready and the information is accessible by other users from other devices during the upload process.

Thus while there have been shown, described and pointed out novel features of the present invention as applied to the preferred embodiments thereof, it will be understood that the various submissions and substitutions and changes in the form and detail are contemplated to the disclosed invention which may be made by those skilled in the art, without departing from the spirit and scope of the invention. It is the intention therefore, to be limited only as indicated by the scope of the claims appended hereto. It is also to be understood that the following claims are intended to cover all of the generic and specific features described, and all statements of the scope of the invention which, as a matter of language, might be said to fall therebetween.

The invention claimed is:

1. A system for uploading a folder comprises:
an endpoint device having a folder stored thereon;
a cloud server in communication with the end point device, the cloud server including a cloud storage for storing a folder unloaded to the cloud server, a database for storing administrative data; and a cloud service application, the cloud service application establishing first communication connection with the end point device and retrieving a user identification for the user of the end point device, an endpoint device name, a folder name, and folder location; and storing the user identification, end point device name, the folder name, and the folder location in the database and causing the end point device to upload the folder to the cloud storage utilizing a second communication connection;
a remote device communicating with the cloud server to access a folder stored on at least one of the end point device and the cloud storage, the remote device providing the user identification and the folder name to the cloud service application as a request to access a folder; the cloud service application determining the user, the end point device name, and the folder name from the administrative database, and providing access to the folder by at least one of providing direct access a.) to the end point device from the remote device utilizing the first communication connection during uploading of a folder to the cloud storage and b.) to the cloud storage;
wherein the cloud service application determines whether the folder is currently being uploaded to the cloud server, and provides access to the end point device if the a file within the folder has not been completely uploaded to the cloud server, and the cloud service application providing access to the file within the folder in the cloud storage if the file has been completely uploaded to the cloud server; and
in response to the request, the cloud service application determines whether the folder is being uploaded to the cloud server, each folder including files, the cloud service application creating a folder name space as a directory of at least one folder and the files contained within a respective one of the at least one folder by merging a first directory of a folder and the respective files within the folder which has been uploaded to the cloud server, and a second directory of files, stored at the endpoint device of the folder and respective files within the folder stored at the endpoint device, and creating the folder name space by merging the first directory and second directory, and presenting the folder name space at the remote device.

2. A cloud server for providing access to a folder being uploaded to the cloud server during the uploading process comprising:
a cloud storage for storing one or more folders;
an administrative database for storing user identification, an end point device name for an end point device from which the folder is uploaded, and a folder location for the folder being uploaded;
a cloud service application for controlling the cloud storage and the administrative database, and for establishing a first communication connection with an end point device; the cloud server application determining a folder to be uploaded in response to a request from the end point device, storing the user identification associated with the user of the input device, the input device name, the name of the folder, and the location of the folder to be uploaded from the end point device, and a second communication connection to upload the folder from the end point device to the cloud storage; and
the cloud service application receiving a request to access the folder, the cloud service application determining the identity of the user making the request and the folder location as a function of the request, and providing access to the folder at at least one of (a) the cloud storage, and (b) the end point device utilizing the first communication connection, as a function of a status of the upload of the folder;
wherein in response to the request, the cloud service application determines whether the folder is being uploaded to the cloud server, each folder including files, the cloud service application creating a folder name space as a directory of at least one folder and the files contained within a respective folder by merging a first directory of folders uploaded to the cloud server and the files contained therein, and a second directory of the folder and files therein as stored at the endpoint device, and creating a folder name space by merging the first directory and second directory and presenting the folder name space at the remote device.

3. A method for uploading a folder from an endpoint device to a cloud server comprising:

storing a folder at the endpoint device;
creating a first communication connection between the endpoint device and the cloud server, the cloud server retrieving a user identification for the user of the endpoint device, an endpoint device name, a folder name and folder location utilizing the communication connection, storing the user identification and endpoint device name, folder name, and the folder location and causing the endpoint device to upload the folder to the cloud server utilizing the second communication connection;
transmitting a request for access to a folder stored on at least one of the endpoint device or the cloud storage by providing the user identification and the folder name to the cloud server, the cloud server determining the user, the endpoint device name, and the folder, and providing access to a file within the folder which has not been uploaded to the cloud server by providing direct access to the endpoint device from the remote device utilizing the first communication connection; and providing access to a file, within the folder, which has been uploaded to the cloud server from the cloud server; and
in response to the request, the cloud service application determining whether the folder is being uploaded to the cloud server, each folder including files, the cloud server creating a folder name space as a directory of at least one folder and the files contained within a respective folder by merging a first directory, stored at the cloud server, of the folder and the files within which are uploaded to the cloud server, and a second directory, stored at the endpoint device, of the folder and files within the folder as stored at the endpoint device, and merging the first directory and second directory and presenting the folder name space at the remote device.

4. The system of claim 1, wherein the cloud service application is an exposed set of an application programming interface.

5. The system of claim 1, wherein the end point device is a personal computer, and wherein the cloud service application presents a folder names apace to the end user device.

6. The system of claim 1, wherein each folder includes one or more files, and the request includes a file name, the cloud service application determines whether the file is currently being uploaded to the cloud server, and provides access to the file at the end point device if the file has not been completely uploaded to the cloud server, and the cloud service application providing access to the file in the cloud storage if the file has been completely uploaded to the cloud storage.

7. The system of claim 1, wherein the first directory includes a first version indicator for indicating a latest version of the at least one folder and the files contained within a respective one of the at least one folder uploaded to the cloud server, the second directory includes a second version indicator for indicating a version of the folder and the files contained therein stored at the endpoint device, the server application comparing the first version indicator with the second version indicator, and determining whether a file stored at the cloud server is a later version than a corresponding file stored at the endpoint device and transmitting later version of the file in response to the request.

8. The cloud server of claim 2, wherein the cloud service application determines the status of the uploading of the folder from the end point device to the cloud storage and provides access to the folder at the end point device, across the first communication connection, when uploading of the folder is ongoing, and provides access to the folder at the cloud storage when it is determined that the uploading of the folder is complete.

9. The cloud server of claim 2, wherein each folder includes one or more files, the request includes a file name, the cloud service application determines the status of the uploading of the file from the end point device to the cloud storage and provides access to the file at the end point device, across the first communication connection, when uploading of the file is ongoing, and provides access to the file at the cloud storage when it is determined that the uploading of the file is complete.

10. The system of claim 2, wherein the first directory includes a first version indicator for indicating the latest version of the at least one folder and the files contained within a respective one of the at least one folder uploaded to the cloud server, the second directory includes a second version indicator for indicating a version of the folder and the files contained therein stored at the endpoint device, the cloud server application comparing the first version indicator to the second version indicator and determining whether a file stored at the cloud server is a later version than a corresponding file stored at the endpoint device and transmitting a later version of the file in response to the request.

11. The method of claim 3, further comprising the step of storing a first latest version indicator of each file as an element of the first directory:
storing a second version indicator for each file as an element of the second directory, comparing the first version indicator of the file with a second indicator of the corresponding file, determining a latest version of the file and transmitting the latest version of the file to the remote device in response to the request.

* * * * *